Nov. 21, 1972    F. H. SHAIR ET AL    3,703,460
NON-EQUILIBRIUM PLASMA REACTOR
FOR NATURAL GAS PROCESSING
Filed Sept. 30, 1970    5 Sheets-Sheet 1

INVENTORS.
Fredrick H. Shair
BY Arakali L. Ravimohan

ATTORNEY.

INVENTORS.
Fredrick H. Shair
Arakali L. Ravimohan
BY

ATTORNEY.

United States Patent Office 3,703,460
Patented Nov. 21, 1972

3,703,460
NON-EQUILIBRIUM PLASMA REACTOR FOR
NATURAL GAS PROCESSING
Frederick H. Shair, Altadena, and Arakali L. Ravimohan, Pasadena, Calif., assignors to the United States of America as represented by the United States Atomic Energy Commission
Filed Sept. 30, 1970, Ser. No. 76,866
Int. Cl. B01k 1/00; C07c 3/24
U.S. Cl. 204—327        2 Claims

ABSTRACT OF THE DISCLOSURE

A non-equilibrium plasma reactor for natural gas processing into ethane and ethylene comprising means of producing a non-equilibrium chemical plasma wherein selective conversion of the methane in natural gas to desired products of ethane and ethylene at a pre-determined ethane/ethylene ratio in the chemical process may be intimately controlled and optimized at a high electrical power efficiency rate by mixing with a recycling gas inert to the chemical process such as argon, helium, or hydrogen, reducing the residence time of the methane in the chemical plasma, selecting the gas pressure in the chemical plasma from a wide range of pressures, and utilizing pulsed electrical discharge producing the chemical plasma.

BACKGROUND OF THE INVENTION

The invention described herein was made in the course of, or under, Contract No. AT(04-3)-767 with the United States Atomic Energy Commission.

A new trend of physical chemistry is developing in the field of applied low-temperature plasma chemistry characterized by physical and chemical processes proceeding at temperatures of $10^3$ to $1.5 \times 10^4$ °K., reaction times ranging from $10^{-5}$ to $10^{-2}$ seconds, and pressures ranging from $10^{-4}$ to $10^4$ atmospheres. Since simple kinetic theory has established a relationship between temperature and the mean translational energy of the molecules of a plasma, temperature becomes an expression of energy. The energy of individual molecules and the number of molecules in any energy interval is given by known distributions. A plasma consists of both positively and negatively charged particles of varying sizes. The smaller particles move much faster than the larger particles and hence will have a much higher temperature—up to several orders of magnitude higher in cases such as positively charged ions and molecules and negatively charged electrons. The ions will also tend to have higher temperatures than the neutral species, i.e., non-ionized molecules, and thus the different constituents of a plasma may have widely different temperatures. A plasma may be characterized as being in an equilibrium or non-equilibrium condition. A plasma in equilibrium satisfies the requirement that all reactant particle-constituents be at the same temperature and that the excited states be populated in a thermal-equilibrium distribution. All the particle-constituents thus would be taking part in the chemical reaction. In a non-equilibrium plasma, not all reactant particle-constituents have or are ionized nor are they at the same temperature and therefore they are not taking part in the chemical reaction. Temperatures may widely differ throughout. It is noted that in plasma chemistry where equilibrium plasmas are employed, the products sought are those in their intermediate steps of a many step chemical process and the process must be quenched in order to reduce the temperature to preserve the constituents at their desired intermediate step. Obviously, quenching is not necessary in a non-equilibrium plasma as the cooler neutral species do the cooling. The low-temperature plasma is characterized by partial or complete ionization of the reacting atoms and molecules. However, in chemical processing, the plasmas used have a very low overall degree of ionizing, e.g., $10^{-3}\%$.

There exists processes and apparatus for methane ($CH_4$) conversion in low-temperature plasmas at reduced pressures wherein the main intermediate conversion products are ethane ($C_2H_6$), ethylene ($C_2H_4$), and acetylene ($C_2H_2$); however these processes are afflicted by requirements such as the necessity for deep cooling of the discharge tube by liquid nitrogen, or for large amounts of electrical current to ionize the particle-constituents resulting in high power levels but low efficiency, or non-selective conversion of methane with excessive amounts of undesired gaseous and solid by-products.

SUMMARY OF THE INVENTION

The present invention comprises a method and apparatus for processing the primary constituent of natural gas-methane into ethane and ethylene whereby the natural gas is mixed with a recycling stream of gas inert to the chemical process, hereinafter denoted as inert gas, such as argon, helium, or hydrogen and introduced into one end of the elongated cylindrical non-equilibrium plasma reactor. A plasma is realized by the creation of a glow discharge interiorly to the plasma reactor by the passage of current between electrically conductive electrodes located at distal ends of the elongated plasma reactor. The natural gas-inert gas mixture, which is under low pressure (no greater than atmospheric) feeds directly into the "positive column" of the glow discharge proximate the positive anode. The chemical plasma of interest is contained within the positive column. Placed interiorly intermediate the elongated plasma reactor ends and forming the first and second chambers of the reactor is the isolation system which constrains passage of all but a small portion of the gas mixture between the chambers but allows the passage of current therethrough and also the direct removal of the gas mixture from the plasma reactor's first interior chamber. The positive column is thus restricted to the first chamber. The second chamber, located intermediate the isolotion system and the negative cathode, collects the gas mixture which passes the isolation system and permits its recycling. Vacuum pumps are operably connected to the first and second chambers and through interrelated control of these vacuum pumps and the gas mixture feed pump, the residence time of the gas mixture in the chemical plasma of the positive column, which is a key factor in optimization of product output, is carefully regulated. The gas mixture effective residence time may additionally be controlled by use of a pulsed discharge forming the positive column. The gas mixture from the first chamber is subjected to standard product separation techniques, such as fractional distillation, and the ethane, ethylene, and hydrogen products are removed and the inert gas and unconverted methane is recycled.

Power levels in the disclosed invention are much lower than those employed in equilibrium plasma.

The fraction of hydrocarbon (methane) in the feed gas mixture determines the overall conversion rate and the ethane/ethylene ratio in the product output.

Accordingly, it is an object of the present invention to provide a method and apparatus for converting methane into ethane and ethylene in a non-equilibrium chemical plasma.

It is also an object of the present invention to provide a method and apparatus to control the ethane-ethylene product distribution when being converted from methane.

A further object of the present invention is to provide a method and apparatus for converting methane into ethane and ethylene products without having to quench the products immediately upon their formation.

A still further object of the present invention is to provide a method and apparatus to attain precise control over the selective conversion of methane to ethane and ethylene with negligible solid products.

Another object of the present invention is to provide a method and apparatus for converting methane into ethane and ethylene in a low-temperature non-equilibrium chemical plasma formed in glow discharge or other similar ionizing device at a high electrical efficiency.

DETAILED DESCRIPTION

Figure 1:
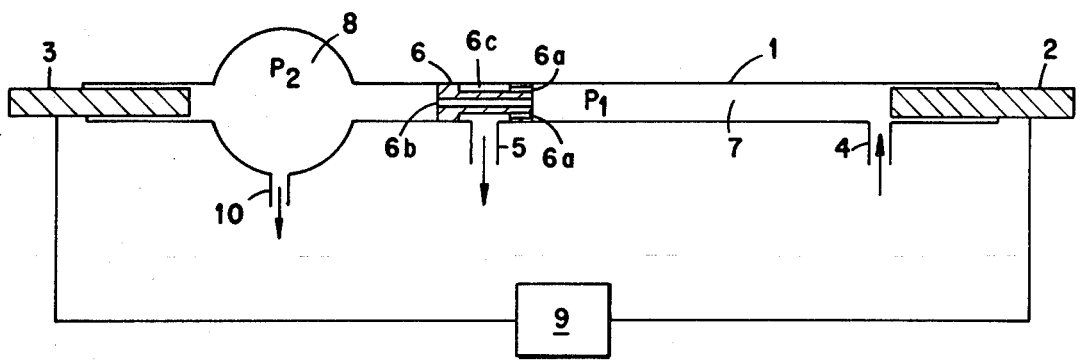
FIG. 1 is a semi-schematic view of a non-equilibrium plasma reactor embodying the present invention.

The embodiment of the invention shown in FIG. 1 comprises elongated cylindrical plasma reactor enclosure 1 which receives the methane-inert gas mixture through inlet 4 proximate the positive anode 2 operably attached to one end of the plasma reactor 1. Negative cathode 3 is operably attached to the opposite end of the plasma reactor 1, both positive anode 2 and negative cathode 3 communicating with the interior portion of plasma reactor 1. Intermediate the distal ends of plasma reactor 1 is isolation system partition member 6 which divides elongated cylindrical plasma reactor 1 into two chambers, a first chamber 7 proximate positive anode 2 and a second chamber 8 proximate negative cathode 3. Chamber 8 has a spherical enlargement in the enclosure intermediate its ends. Isolation system 6 rests in nesting relationship with the interior walls of plasma reactor 1 and has a passageway 6b communicating between chambers 7 and 8 therethrough. Passageways 6a then communicate the first chamber 7 with annular groove 6c formed in the center portion of isolation system 6. Annular groove 6c then communicates with the ethane-ethylene products, unconverted methane-inert gas outlet 5. Similarly, the gas mixture which passes through passageway 6b of isolation system 6 is exhausted from the second chamber 8 by outlet 10 communicating therewith. It is to be noted that it is possible to operate the apparatus of FIG. 1 with the natural gas-inert gas mixture entering at 5 and the ethane-ethylene products and unconverted methane-inert gas mixture exiting at 4.

Direct current electrical power to form the glow discharge is supplied the positive anode 2 and negative cathode 3 by D.C. power supply 9.

Operation of the embodiment of the invention as shown in FIG. 1 is accomplished by introducing the natural gas-inert gas mixture into the non-equilibrium plasma reactor 1 proximate the positive anode 2. An electrical potential is applied the anode 2 and cathode 3 which causes a portion of the gas particles to ionize and when an ionized particle path is completed between the electrodes, an electrical current is passed and the D.C. glow discharge initiated. The so called "positive column" is formed in discharge chamber 7 and occupies the majority portion of the chamber. The gas temperature of the positive column is relatively low indicating that thermal ionization is not a factor in the maintenance of the electrical conductance of the column. The chemical plasma formed in the positive column has equal concentrations of positive and negative particle-constituents, each with its own distribution and temperature. The chemical plasma therein formed provides the mechanism for the necessary combinations forming ethane $(C_2H_6)$ and ethylene $(C_2H_4)$ from methane $(CH_4)$. Hydrogen $(H_2)$ and a small amount of acetylene $(C_2H_2)$ are by-products. Not intending to be found to any particular theory of the mechanism by which the conversion of methane to ethane and ethylene is effected, it is probable that the chemical reactions are as follows:

$$2CH_4 \rightarrow C_2H_6 + H_2$$
$$2CH_4 \rightarrow C_2H_4 + 2H_2$$

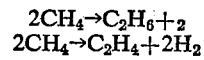

Figure 5:
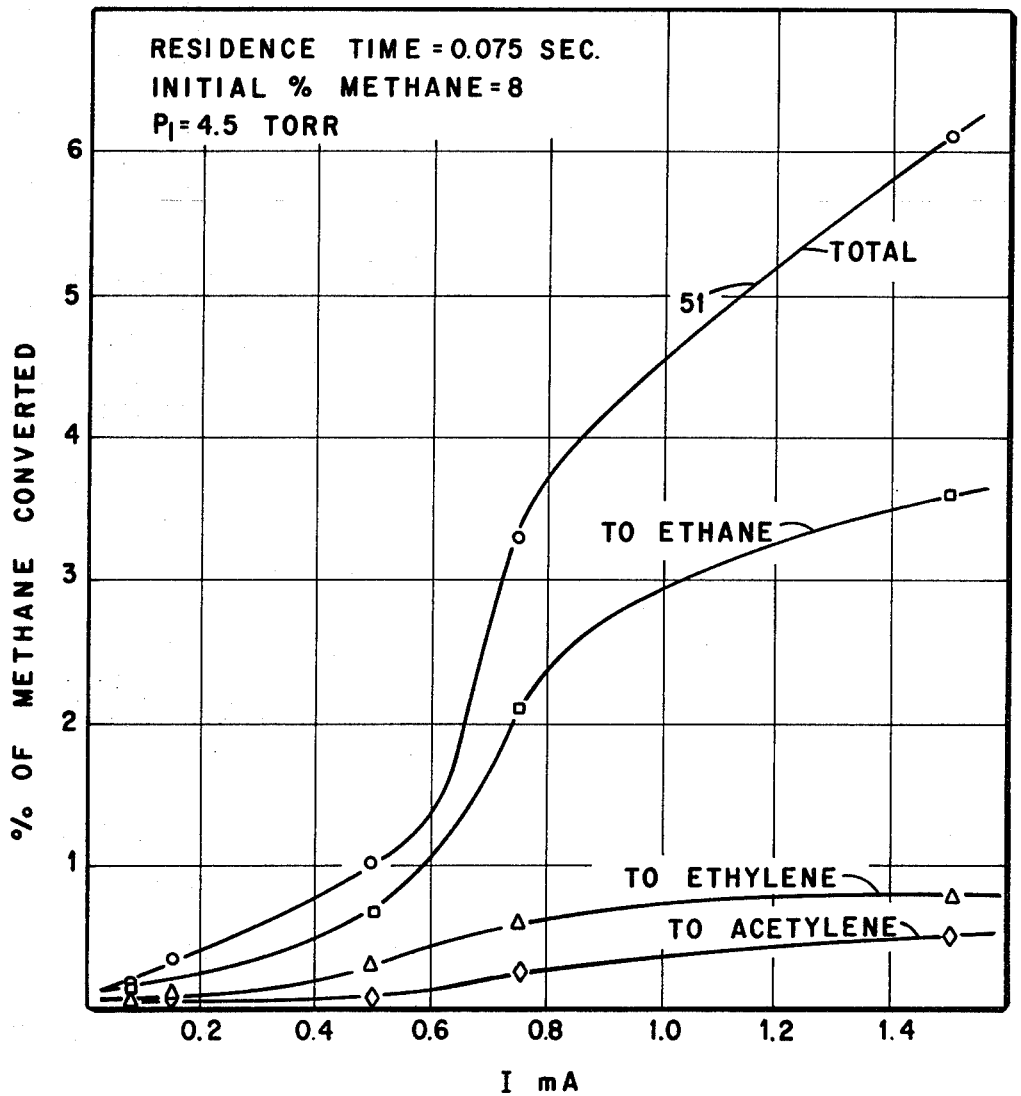
FIG. 5 is a graph showing the percentage of methane converted vs. current flow in the plasma reactor of FIG. 1 for a given methane-inert gas mixture.
Figure 6:
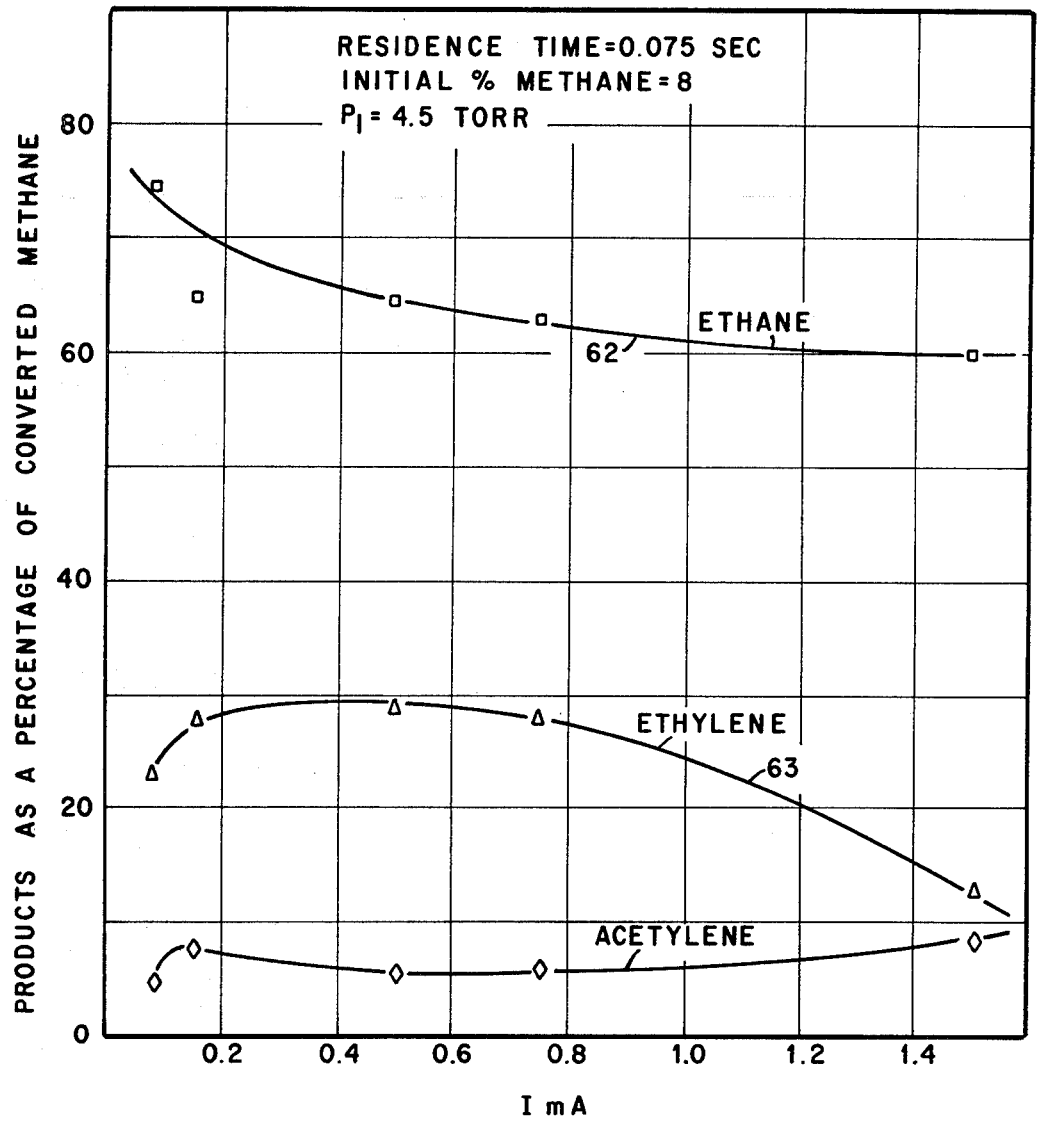
FIG. 6 is a graph showing the output product distribution as a function of current flow in the plasma reactor of FIG. 1 for a given proportion methane-inert gas mixture.
Figure 7:
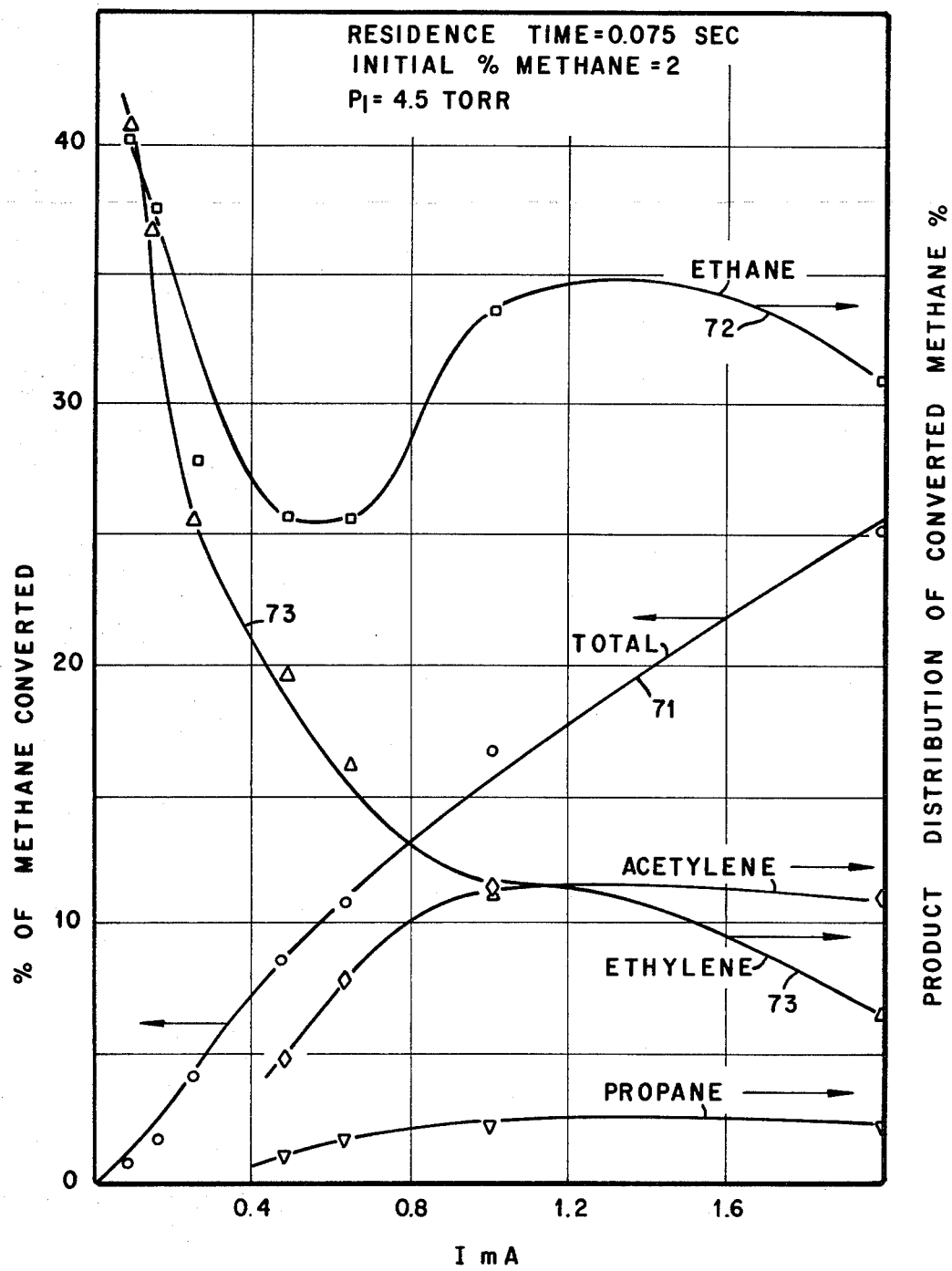
FIG. 7 is a graph showing the percentage of methane converted and output product distribution as a function of current flow in the plasma reactor of FIG. 1 for another given proportion methane-inert gas mixture.

As can be seen from experimental data plots 51 and 71 of the graphs of FIGS. 5 and 7, the fraction of hydrocarbon in the feed gas mixture, i.e., methane in the natural gas-inert gas mixture, determines the percentage of methane converted—for example, for parameters constant at I=0.8 ma., Pl=4.5 torr, and residence time=75 msec., about 3.6% of the available methane is converted in the 8% methane-inert gas mixture whereas for a 2% methane-inert gas mixture, about 13% of the available methane in the natural gas-inert gas mixture also determines the ethane-ethylene ratio in the product output—for example, from experimental data plots 62 and 63, and 72 and 73 of the graphs of FIGS. 6 and 7, under the same constant parameters as listed above, 62% of the product output was ethane and 28% ethylene for the 8% methane-inert gas mixture whereas for a 2% methane-inert gas mixture, 28% of the product output was ethane and 13% ethylene.

Optimization of product output is determined by the length of time the gas mixture remains in the electrical discharge and the pressure at which chamber 7 is maintained. Residence time is determined by the gas mixture inlet-outlet flow and it may effectively be further lessened as desired by the use of pulse discharge in the power supply-electrode circuit. The residence time of the gas mixture should be in the range of 1–100 milliseconds and the gas pressure in the range of 1 mm. Hg—1 atmosphere. Power levels in terms of watts per cubic centimeter of gas are much lower than those employed in equilibrium plasmas (arcs and induction torches). At a pressure of a few (1–10) mm. Hg power levels are of the order of $10^{-1}$ watts/cm.$^3$ and at higher pressures (½–1 atm.), it can be as low as $10^{-2}$ watts/cm.$^3$.

Figure 2:
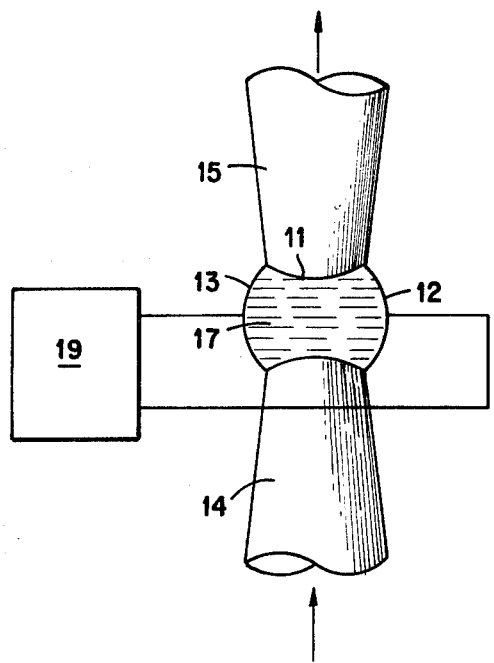
FIG. 2 is a semi-schematic view of a modified form of a non-equilibrium plasma reactor.

FIG. 2 illustrates a second embodiment of a non-equilibrium plasma reactor 11 suggested by FIG. 1 comprising the discharge chamber 17, the natural gas-inert gas mixture inlet 14 communicating therewith, and the discharge chamber output product-inert gas outlet 15. Pulsed D.C. power is supplied the discharge chamber 17 by power supply 19 making electrical contact with positive anode 12 and negative cathode 13. Application of the pulsed D.C. power to the electrodes creates the glow discharge in the discharge chamber between the electrodes forming the chemical plasma in the positive column permitting the necessary chemical reactions to obtain the ethane and ethylene products. As detailed in the description of the plasma reactor of FIG. 1, the residence time of the gas mixture in the discharge chamber 17 is maintained for a relatively short interval. The pulsed D.C. power supply 19 then applies electrical pulses to the electrodes 12 and 13 at least once and optimally several times during the interval of the gas mixture actual residence time in the chamber.

Figure 3:
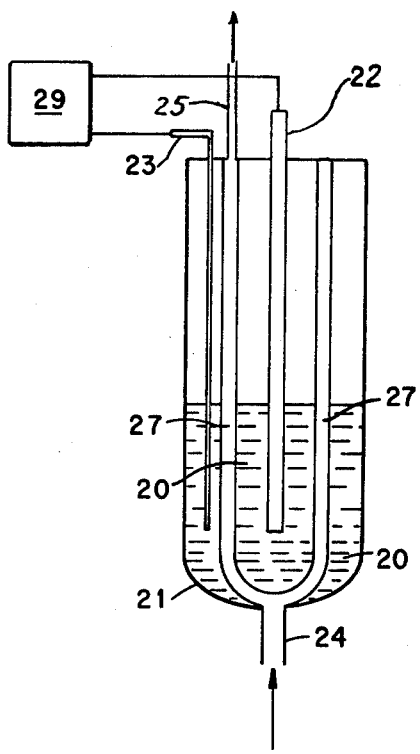
FIG. 3 is a semi-schematic view of another alternative embodiment of a non-equilibrium plasma reactor.

FIG. 3 illustrates a third embodiment of a non-equilibrium plasma reactor 21, commonly known as an ozonizer, suggested by FIG. 1 comprising the ionizing chamber 27, a U-shaped tube with a pair of spaced apart parallel arms connected by an arcuate shaped web, the natural gas-inert gas mixture inlet 24 communicating therewith, and the chamber output product-inert gas outlet 25. Low frequency A.C. voltage is supplied the ionizing chamber 27 by A.C. power supply 29 making electrical contact with electrodes 22 and 23. Electrolyte 20 surrounds the lower portion of ionizing chamber 27 and conducts the electricity to the walls of the ionizing chamber 27.

It is noted that the plasma reactors of FIGS. 1, 2, and 3 are not limited to the aforestated mode of electrical power, but may also use radio-frequency or microwave modes.

Figure 4:
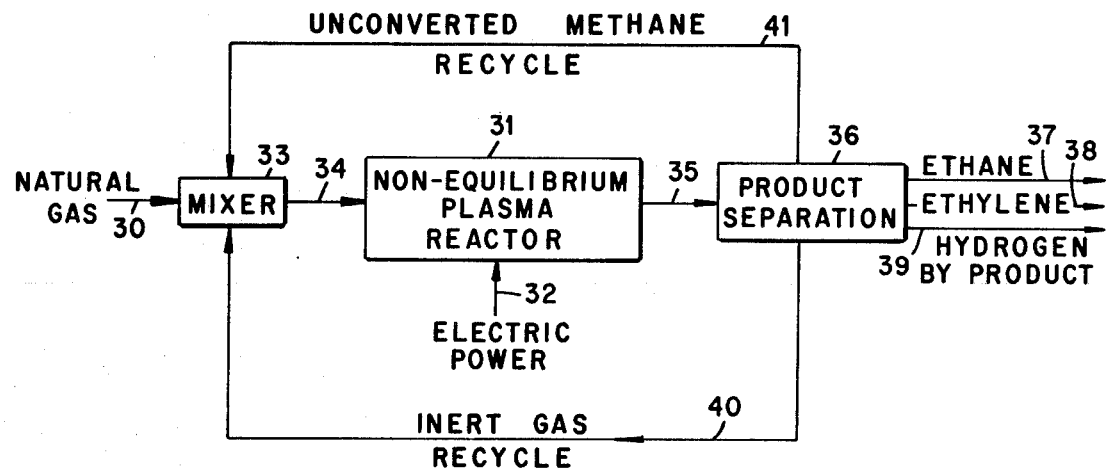
FIG. 4 is a flow sheet of the overall process for producing ethane and ethylene from natural gas according to the invention.

FIG. 4 illustrates the overall methane conversion process utilizing the non-equilibrium plasma reactor 31 receiving the natural gas-inert gas mixture from the mixer 33 by means of gas passageway 34. Electrical power is supplied plasma reactor 31 by electrical power supply means 32. The chemically reacted gas mixture exits plasma reactor 31 by passageway 35 to product separation means 36. The boiling points of the gas mixture constituents— ethane $-88.6°$ C., ethylene $-103.9°$ C., methane $-161.4°$ C., argon $-185.7°$ C., and hydrogen $-252.7°$ C. are different enough for standard separation techniques e.g., fractional distillation, to be employed. This results in three streams for ethane 37, ethylene 38, and hydrogen products 39, and two recycle streams for the inert gas 40 and unconverted methane 41 which are taken back to mixer 33. The recycled methane and inert gas are mixed with incoming natural gas 30 and the whole process cycle repeats itself.

What we claim is:

1. A non-equilibrium plasma reactor for converting methane into ethane and ethylene comprising:

an elongated tubular enclosure defining a reaction chamber therein and having a gas outlet at one end and in central portions together with a gas inlet at the other end thereof;

cathode and anode means disposed at opposite ends of said enclosure proximate the gas outlet and inlet thereat, respectively;

an isolation system partition member disposed centrally in said reaction chamber and dividing said chamber in first and second chamber portions in the anode and cathode regions, respectively, said member defining an axial passage intercommunicating said first and second chamber portions and further defining a passageway communicating peripherally with said first chamber portion with said central gas outlet so that gas introduced at said gas inlet is discharged partially at each of said outlets;

gas supply means for introducing a mixture comprising methane and an inert gas through said gas inlet proximate the anode into said chamber portions;

power supply means for applying a potential between said anode and cathode means effective to create a non-equilibrium, low-temperature, positive column glow-discharge plasma from said gas mixture in said first reaction chamber portion so as to convert said methane into ethane and ethylene therein; and means for withdrawing and separating the ethane and ethylene from the reaction mixture communicating with said central outlet.

2. A non-equilibrium plasma reactor as recited in claim 1 wherein said elongated tubular enclosure further defines an enlarged chamber volume in said second chamber portion and communicating with said outlet therein and said inert gas of said mixture comprises a material selected from the group consisting of argon, helium and hydrogen.

References Cited

UNITED STATES PATENTS

| 1,376,180 | 4/1921 | Wickersham | 204—323 X |
| 3,005,762 | 10/1961 | Fenn | 204—164 |
| 3,541,379 | 11/1970 | Holden | 313—321 |

FOREIGN PATENTS

| 1,225,418 | 6/1960 | France | 204—323 |
| 22,664 | 10/1912 | Norway | 204—323 |

FREDERICK C. EDMUNDSON, Primary Examiner

U.S. Cl. X.R.

204—170